Jan. 8, 1935.  R. S. HOPKINS  1,987,064
EDGE PRINTER
Filed May 9, 1932  2 Sheets-Sheet 1

Inventor:
Roy S. Hopkins,
By Newton M. Pennis
George A. Gillette, Jr.
Attorneys

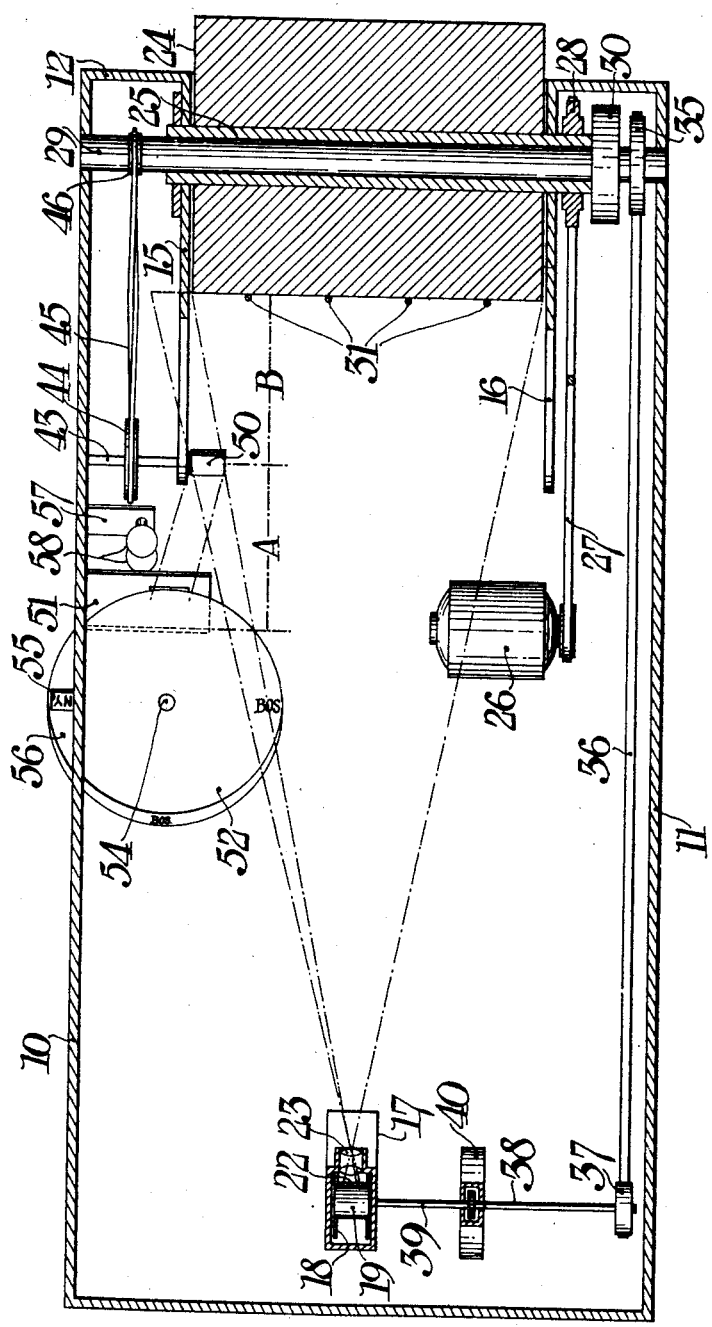

Patented Jan. 8, 1935

1,987,064

UNITED STATES PATENT OFFICE 1,987,064

EDGE PRINTER

Roy S. Hopkins, Rochester, N. Y., assignor to Eastman Kodak Company, Rochester, N. Y., a corporation of New York Application May 9, 1932, Serial No. 610,062

12 Claims. (Cl. 88—24)

The present invention relates to an edge printer for identification of reproduced documents and more particularly to an edge printer which deflects the image of stationary identification data onto continuously moving light sensitive material and which imparts apparent movement to the deflected image of the identifying data.

Heretofore, the identification of documents continuously passing through a photographic recording apparatus has not been accomplished in a practical manner.

The primary object of the present invention is the provision of a photographic recording apparatus with a continuously moving film strip and with an identifying means for projecting a moving image of stationary identification data onto said film strip.

Another object of the present invention is the provision in a photographic recording apparatus with a camera having an exposure position and a photographic field, of a film strip and documents moving respectively through said exposure position and said photographic field, and an identifying means for projecting a moving image of stationary identification data into said exposure position, said image moving in synchronism with the images of said documents.

A further object of the present invention is the provision in a photographic recording apparatus with a camera having an exposure position through which a film strip moves continuously and having a photographic field through which documents to be reproduced are moved continuously, of a continuously rotating mirror located with respect to a stationary legend so that the image of the legend is projected into the exposure position and is imparted apparent movement in synchronism with the images of the moving documents.

Still another object of the present invention is the provision of an identifying means including a stationary arcuate support or circular band for identification data and a mirror rotating about the axis of curvature of the arcuate support or circular band.

A still further object of the present invention is the provision in a photographic recording apparatus having a rotating drum for continuously feeding documents through a photographic field, of an identifying means including a stationary arcuate support or circular band for identification data and a mirror rotating about the axis of curvature of said arcuate support or circular band, said axis being equi-distant from the periphery of said drum and the data bearing surface of said support or band.

Other objects will be suggested to those skilled in the art as the description of the invention is set forth hereinafter.

Briefly, the invention relates to the inclusion in a photographic recording apparatus adapted to continuously receive and reproduce documents, of an identifying means for projecting a moving image of stationary identification data onto a continuously moving film strip, the velocity of said image being equal to the velocity of the image of the documents passing through the apparatus.

Reference is hereby made to the accompanying drawings in which like reference numerals designate similar elements and in which:

Fig. 2 is a horizontal cross-section of a photographic recording apparatus having an identifying means according to the invention and taken on the line 2—2 of Fig. 1.

Figure 1:
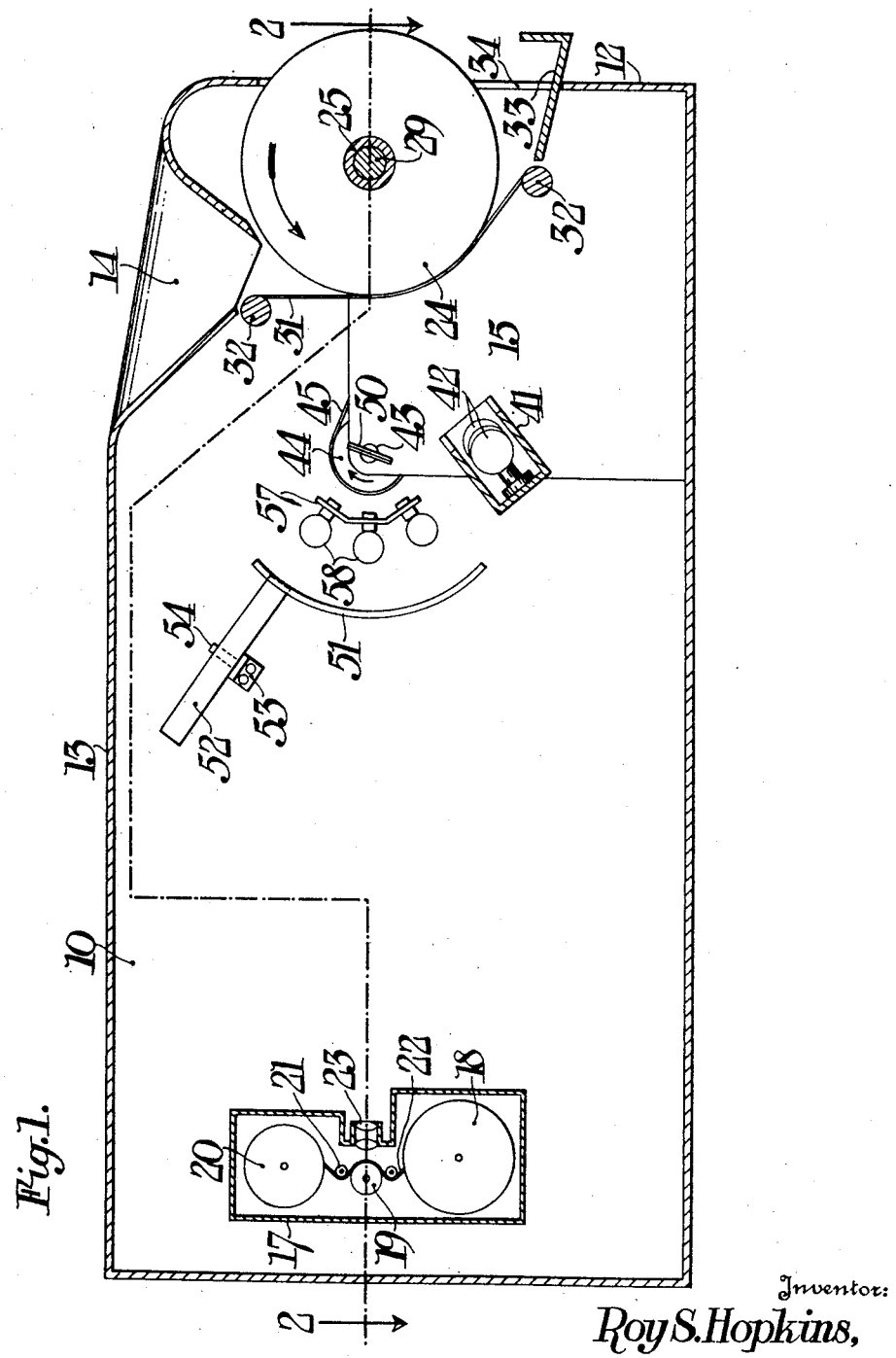
Fig. 1 is a vertical longitudinal cross-section through the center of a photographic recording apparatus having an identifying means according to the invention.

In the illustrated embodiment of the invention, the photographic recording apparatus is enclosed within a compartment having side walls 10 and 11, an end wall 12 and a top 13 provided with a chute 14. A pair of side plates 15 and 16 are positioned within said compartment abutting end wall 12 and in parallel space relation to side walls 10 and 11, respectively.

A suitable camera 17 is located within said compartment at the end opposite end wall 12. Camera 17 contains a supply reel 18, and advancing roll 19, a take-up reel 20 and guide rolls 21 for conducting a film strip 22 from supply reel 18, around advancing roll 19 to the take-up reel 20. An objective 23 is attached to the front wall of camera 17.

A cylindrical drum 24 is mounted upon a sleeve 25 which is rotatably supported by and extends between side plates 15 and 16. A prime mover 26, such as an electric motor, drives a belt 27 which encircles a pulley 28, fastened to sleeve 25 so that cylindrical drum 24 is continuously rotated by prime mover 26 in the direction indicated by the arrow, see Fig. 1.

A shaft 29 is rotatably mounted in side walls 10 and 11, and extends through the interior of sleeve 25. A clutch 30 cooperates with sleeve 25 and shaft 29 so that shaft 29 is driven by sleeve 25 during engagement of clutch 30 but is not driven by sleeve 25 and remains stationary during disengagement of clutch 30. The internal construction of clutch 30 is not here described and may be of any suitable and well-known type, or may be similar to that disclosed in the co-pending application of Roy S. Hopkins and Carter J. Hughey, Serial No. 478,838 filed August 30, 1930.

A plurality of guide wires 31 are supported in spaced relation on rod 32 and make contact with the periphery of drum 24 for a portion of its circumference. A tray 33 extends through a recess 34 in end wall 12 and has one end adjacent the lower end of guide wires 31 on lower rod 32.

A pulley 35 is keyed to shaft 29 and drives an endless belt or chain 36 to turn a pulley 37 mounted upon a shaft 38. A second shaft 39 is driven through a reduction gear box 40 by shaft 38 and in turn drives the advancing roll 19 in camera 17.

The feeding means of the invention includes the rotating cylindrical drum 24 and the guide wires 31, and cooperates with chute 14 and tray 33 so that a document or plurality of documents may be introduced one at a time into chute 14, will be moved in contact with the periphery of drum 24 for a fraction of a revolution and will be discharged into tray 33.

A reflector 41 contains a bank of incandescent lamps 42 and is located within the reproducing apparatus to illuminate the documents as they pass through the feeding means in contact with the periphery of drum 24. Objective 23 of camera 17 is so selected and so positioned between the film strip 22 and drum 24 that the documents moving through the feeding means are moved through the photographic field of objective 23 and so that the images of the documents are focused upon the film strip 22 in an exposure position within camera 17.

The advancing means for the film strip 22 may include advancing roll 19, reels 18 and 20, shaft 39 and the elements producing rotation of shaft 39. The advancing means may be driven by the feeding means but preferably only when a document is passing through the photographic field of the feeding means. This may be accomplished by a suitable means (not shown) causing engagement of clutch 30 when a document is in the photographic field or as specifically disclosed in the aforementioned copending application of Hopkins and Hughey.

Since objective 23 causes inversion of the images passing therethrough, the documents must move in a direction opposite to the movement of the film strip 22, that is, the documents move substantially downwardly in the feeding means while the film strip 22 is moved substantially upwardly through camera 17 by the advancing roll 19. The magnification of objective 23 must also be so balanced with the velocity of the documents and film strip 22 so that there will be no relative movement of the document image with respect to film strip 22.

The identifying means which forms the essence of the invention will now be described. Broadly, such identifying means comprises a rotating optical member for projecting an image of stationary identification data into the camera exposure position and imparting apparent movement to the identifying data image equal to the movement of the document image and the movement of the film strip 22 through said exposure position.

The shaft 43, see Fig. 2, is rotatably mounted in side wall 10 and side plate 15. A pulley 44 on shaft 43 is driven in the direction of the arrow, see Fig. 1, by a cross belt 45 which encircles and is driven by a pulley 46 keyed to shaft 29. The diameter of pulley 43 is twice that of the diameter of pulley 46 for a reason that will be later explained.

The shaft 43 extends through side plate 15 to support the rotating optical member of the identifying means which is preferably a two-faced mirror 50, the axis of shaft 43 passing through the reflecting surface of said two-faced mirror 50.

A stationary arcuate support or circular band 51 is positioned within the compartment and is adapted to receive suitable permanent identifying data upon its concave surface. Identifying data which is frequently changed is placed upon the periphery of a narrow drum 52 which is rotatably mounted on side wall 10 by a bracket 53 and spindle 54. Narrow drum 52 is located with respect to arcuate support or circular band 51 so that the periphery of drum 52 is visible through an aperture 55 in support or band 51.

The periphery of drum 52 is provided with a plurality of identifying markings which must be frequently changed, such as the destination of the reproduction of the documents. Each individual destination can be set within aperture 55 and a corresponding designation of the destination is provided on the top of the drum and angularly displaced from the marking on the drum periphery so that the operator can observe the setting of drum 52 through the aperture 55 in mask 56 exteriorly attached to side plate 10.

The axis of curvature of the stationary arcuate support 51 coincides with the axis of rotation of shaft 43 and mirror 50. The support 51 is preferably of circular formation and has a radius of curvature equal to the distance between the nearest element of drum 24 and the axis of rotation for shaft 43 and mirror 50, that is, see Fig. 2, distance A is equal to distance B. The normal photographic field of camera 17 is laterally limited by the axial extent of drum 24, however, the mirror 50 and stationary arcuate support 51 apparently increase this normal photographic field as indicated by the dash and dot lines at one end of drum 24. The major portion of the exposure position in camera 17 is occupied by the normal photographic field image while the margin of the exposure position is occupied by the image of the identifying data.

By virtue of the law of reflection, the image of any data on the concave surface of stationary support 51 is moved through twice the angle that the mirror 50 is moved, upon rotation of shaft 43. That is, if mirror 50 rotates at the same angular velocity as drum 24 then the image of the data on support 51 will be moved through the exposure position of camera 17 at double the speed at which the image of the documents passing through the photographic field is moved by the feeding means. Therefore, the angular velocity of mirror 50 should be one-half of the angular velocity of drum 24 and consequently pulley 44 has a diameter which is twice that of pulley 46.

The photographic recording apparatus with an edge printing attachment according to the present invention operates in the following manner: The prime mover 26 operates continuously to rotate drum 24 and sleeve 25, but shaft 29, film advancing roll 19 and mirror 15 remain stationary until a document is inserted into the feeding means. When a document is introduced through chute 14 to move around the periphery of drum 24, clutch 30 is moved in a known manner into engagement, whereupon shaft 29, film advancing roll 19 and mirror 50 are rotated. Mirror 50 by its rotation gives apparent motion to the data on stationary support 51 so that the identifying data on support 51 is printed along the edge margin of the film adjacent the image of the document. The eye placed in the position of objective 23 would observe a moving document and an image of identifying data from support 51 which would appear to move together or in synchronism with the document. After the document has passed through the feeding means, clutch 30 is disengaged in a known manner, and shaft 29, film advancing roll 19 and mirror 50 come to rest until the next document is fed into the feeding means and the cycle is repeated.

Since many modifications of the present invention will be apparent to those skilled in the art, the present disclosure is to be construed in an illustrative and not in a limiting sense.

Having now particularly described my invention, what I desire to secure by Letters Patent of the United States and what I claim is:

1. In a photographic recording apparatus, the combination with a camera having an exposure position, and an advancing means adapted continuously to move a film strip through said exposure position, of a stationary support provided with identifying data which is also stationary, and an optical means for directing a moving image of said stationary data into said exposure position.

2. In a photographic recording apparatus, the combination with a camera having an exposure position, and an advancing means adapted continuously to move a film strip through said exposure position, of a stationary support provided with identifying data which is also stationary, and an optical means for directing an image of said data into said exposure position and adapted to be rotated to move said image through said exposure position in synchronism with said film strip.

3. In a photographic recording apparatus, the combination with a camera having an exposure position, and an advancing means adapted continuously to move a film strip through said exposure position, of a stationary support provided with identifying data which is also stationary and a mirror located to direct an image of said data into said exposure position and adapted to be rotated to move said image through said exposure position in synchronism with said film strip.

4. In a photographic recording apparatus, the combination with a camera having an exposure position, and an advancing means adapted continuously to move a film strip through said exposure position, of an arcuate stationary support having an axis of curvature and provided with identifying data, and a mirror adapted to be rotated about an axis of rotation which coincides with the axis of curvature of said arcuate support.

5. In a photographic recording apparatus, the combination with a camera having an exposure position, and an advancing means adapted continuously to move a film strip through said exposure position, of a circular band having permanent identifying data on its concave surface and provided with an aperture, a drum having identification data on its periphery which is visible through the aperture in said band and a mirror adapted to be rotated about an axis at the center of curvature of said circular band.

6. In a photographic recording apparatus, the combination with a camera having an exposure position, and a photographic field, an advancing means adapted to continuously move a film strip through said exposure position, and a feeding means adapted continuously to move documents through said photographic field, of a stationary support provided with identifying data and an optical member adapted to be rotated by said feeding means and located to direct an image of said data into said exposure position.

7. In a photographic recording apparatus, the combination with a camera having an exposure position, and a photographic field, an advancing means adapted to continuously move a film strip through said exposure position, and a rotatable drum adapted continuously to move documents through said photographic field, of a stationary arcuate support provided with identifying data on its concave surface and a mirror adapted to be rotated about an axis at the center of curvature of said arcuate support and located to reflect an image of said data into said exposure position.

8. In a photograpic recording apparatus, the combination with a camera having an exposure position and a photographic field, an advancing means adapted to continuously move a film strip through said exposure position, and a feeding means adapted continuously to move documents through said photographic field, of a stationary circularly curved band generated about an axis of curvature and provided on its concave surface with identifying data, and a mirror adapted to be rotated by said feeding means about an axis coinciding with said axis of curvature.

9. In a photographic recording apparatus, the combination with a camera having an exposure position and a photographic field, an advancing means adapted to continuously move a film strip through said exposure position, and a rotatable drum adapted continuously to move documents through said photographic field, of a circular band provided on its concave surface with identifying data, and a mirror adapted to be rotated about an axis equi-distant from the nearest element of said drum and said concave surface of said band.

10. In a photographic recording apparatus, the combination with a feeding means for documents and including a drum, of a circular band provided on its concave surface with identifying data and having a radius equal to the radius of said drum, and a mirror adapted to be rotated by said feeding means about an axis equi-distant from said drum and said band.

11. In a photographic recording apparatus, the combination with a feeding means for documents and including a drum, of a circular band provided on its concave surface with identifying data and having a radius equal to the radius of said drum, and a mirror adapted to be rotated by said feeding means about an axis equi-distant from said drum and said band, in opposite direction and at one-half the angular velocity of said drum.

12. In a photographic recording apparatus, the combination with a feeding means for documents and including a drum, of a circular band provided on its concave surface with permanent identifying data and provided with an aperture, a second drum having a plurality of markings on its periphery which are visible through said aperture and having a plurality of corresponding markings on one end which are angularly displaced from the first mentioned markings, a mask provided with an aperture to register with the markings on the end of the drum to indicate the data on said second drum which is visible through the aperture in said band, and a mirror adapted to be rotated by said drum about an axis at the center of curvature of said band.

ROY S. HOPKINS.